(12) United States Patent
Cao et al.

(10) Patent No.: US 11,762,702 B1
(45) Date of Patent: Sep. 19, 2023

(54) RESILIENCE TESTING USING A DECLARATIVE ENGINE FOR WORKLOADS (DEW)

(71) Applicant: Snowflake Inc., Bozeman, MT (US)

(72) Inventors: Yuchen Cao, Foster City, CA (US); Stephen Mark Andrew Clark, Menlo Park, CA (US); Supriya Vasudevan, San Jose, CA (US); Jinzhou Yang, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 19 days.

(21) Appl. No.: 17/660,055

(22) Filed: Apr. 21, 2022

Related U.S. Application Data

(63) Continuation of application No. 17/659,925, filed on Apr. 20, 2022.

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 6,584,487 B1 | 6/2003 | Saboff | |
| 7,356,559 B1 | 4/2008 | Jacobs et al. | |
| 8,549,535 B2 | 10/2013 | Dorn et al. | |
| 10,698,733 B1 * | 6/2020 | Lee | G06F 9/44505 |
| 10,996,658 B1 | 5/2021 | Potts et al. | |
| 11,055,273 B1 | 7/2021 | Meduri et al. | |
| 11,134,013 B1 | 9/2021 | Allen et al. | |
| 11,200,155 B2 * | 12/2021 | Subbunarayanan | G06F 11/3688 |
| 11,467,945 B1 * | 10/2022 | Cao | G06F 11/3664 |
| 2005/0234575 A1 | 10/2005 | Wu et al. | |
| 2009/0112666 A1 | 4/2009 | Guo et al. | |
| 2009/0313614 A1 | 12/2009 | Andrade et al. | |

(Continued)

FOREIGN PATENT DOCUMENTS

| | | |
|---|---|---|
| AU | 2020296966 A1 | 1/2022 |
| WO | WO-2020/254761 A1 | 12/2020 |

OTHER PUBLICATIONS

"U.S. Appl. No. 17/659,925, Non-Final Office Action dated Sep. 29, 2022", 13 pgs.

(Continued)

*Primary Examiner* — Philip Wang
(74) *Attorney, Agent, or Firm* — Schwegman Lundberg & Woessner, P.A.

(57) ABSTRACT

Provided herein are systems and methods for resilience testing using a DEW. A system includes at least one hardware processor coupled to a memory and configured to decode a workflow to obtain a plurality of workflow steps. Each workflow step of the plurality of workflow steps includes a runtime engine identifier and a script identifier. A script for a workflow step of the plurality of workflow steps is retrieved based on the script identifier. The script specifies a plurality of tasks. One or more containers are configured with a runtime engine based on the runtime engine identifier. The script executes against the one or more containers using the runtime engine, to perform the plurality of tasks.

30 Claims, 16 Drawing Sheets

(56) References Cited

U.S. PATENT DOCUMENTS

| | | |
|---|---|---|
| 2011/0137923 A1 | 6/2011 | Koroteyev et al. |
| 2012/0254286 A1* | 10/2012 | Harlow ............... C09B 43/06 709/202 |
| 2015/0106153 A1* | 4/2015 | Kibbar ............. G06Q 10/06316 705/7.26 |
| 2016/0371068 A1 | 12/2016 | Ishii |
| 2017/0090994 A1 | 3/2017 | Jubinski et al. |
| 2017/0103015 A1 | 4/2017 | Bosschaert et al. |
| 2018/0165122 A1 | 6/2018 | Dobrev |
| 2018/0181446 A1 | 6/2018 | Bequet et al. |
| 2018/0181632 A1 | 6/2018 | Zarum et al. |
| 2018/0336062 A1 | 11/2018 | Kolachala et al. |
| 2018/0373509 A1 | 12/2018 | Zhang et al. |
| 2019/0087763 A1 | 3/2019 | Stone |
| 2019/0146998 A1 | 5/2019 | Jin et al. |
| 2019/0303213 A1 | 10/2019 | Chaganti et al. |
| 2019/0332423 A1* | 10/2019 | Shanmugam ......... G06F 9/4881 |
| 2021/0373830 A1* | 12/2021 | Kitazawa ............... G06Q 10/06 |
| 2022/0092058 A1 | 3/2022 | Vijayan et al. |
| 2022/0236972 A1 | 7/2022 | Alugubelli et al. |
| 2022/0261240 A1 | 8/2022 | Abbas et al. |
| 2022/0261281 A1 | 8/2022 | Bequet et al. |
| 2022/0269548 A1* | 8/2022 | Dwivedi ............. G06F 11/3006 |
| 2022/0277136 A1 | 9/2022 | Shekhar et al. |
| 2022/0284278 A1 | 9/2022 | Tang et al. |
| 2022/0374282 A1* | 11/2022 | Caine ..................... G06F 9/485 |
| 2023/0082186 A1* | 3/2023 | Balcha ................ G06F 11/1451 714/4.11 |
| 2023/0199225 A1* | 6/2023 | Pettersson ............. H04N 19/70 375/240.12 |

OTHER PUBLICATIONS

"U.S. Appl. No. 17/659,925, Response filed Dec. 29, 2022 to Non-Final Office Action dated Sep. 29, 2022", 12 pgs.

"U.S. Appl. No. 17/659,925, Response filed Mar. 29, 2023 to Final Office Action dated Jan. 23, 2023,", 14 pages.

"U.S. Appl. No. 17/659,925, Notice of Allowance dated Apr. 19, 2023", 7 pages.

"U.S. Appl. No. 17/659,925, Final Office Action dated Jan. 23, 2023", 12 pgs.

* cited by examiner

```
PERIODIC (INTERVAL = DURATION.OFMILLIS(100),
          COUNT = 3)
{
  SERIAL {
    LOG("ACTION")
  }
}
```

404 →

```
PERIODIC (INTERVAL = DURATION.OFMILLIS(10),
          COUNT = 10,
          STYLE = RANDOM)
{
  QUERY("SELECT CURRENT_TIMESTAMP()")
}
```

```
PLAN {
    VAL BASIC = DURATIONRECORDER("BASIC", LOG_BASIC_SUMMARY)
        CONFIG {
            DURATIONRECORDER ("STAT1", STATSD_TIMER)
            DURATIONRECORDER (BASIC)
        }
        SERIAL {
            PARALLEL {
                LOG ("BEGIN")
                LOG ("P1").RECORDDURATION(BASIC)
                LOG ("END")
            }.RECORDDURATION("STAT1")
        }
}
```

FIG. 7

```
802
CONFIG{
    DURATIONRECORDER (STAT1RECORDER, STATSD_TIMER,
        TAGS = MAPOF("DIM1" TO "VAL1", "DIM2" TO "VAL2"))
}
```

```
804
CONFIG{
    DURATIONRECORDER ("R1", HDR_HISTOGRAM)
    DURATIONRECORDER ("R2", HDR_HISTOGRAM)

HDRPLOT ("R1", "R2")
    HDRPLOT ("R1") . DISABLEOPEN()
}
```

FIG. 8

```
CONFIG{
    DBCONNECTIONSOURCE(
        NAME = "QA2-ADMIN",
        HOST = "CORP.ABCDCOMPUTING.COM",
        PORT = 8084,
        PROPERTIES = MAPOF(
            "USER" TO "ADMIN",
            "PASSWORD" TO "******",
            "ACCOUNT" TO "CORP",
            "SSL" TO "OFF",
        ))
}
```

FIG. 9

```
CONFIG {
    DBCONNECTIONPOOL(
        NAME = "QA2-ADMIN-POOL",
        DEFAULT = TRUE,
        HOST = "CORP.ABCDCOMPUTING.COM",
        PORT = 8084,
        PROPERTIES = MAPOF(
            "USER" TO "ADMIN",
            "PASSWORD" TO "******",
            "ACCOUNT" TO "CORP",
            "SSL" TO "OFF",
        ))
}
```

FIG. 10

RESILIENCE TESTING USING A DECLARATIVE ENGINE FOR WORKLOADS (DEW)

CROSS-REFERENCE TO RELATED APPLICATION

This application is a Continuation of U.S. patent application Ser. No. 17/659,925, filed Apr. 20, 2022, the contents of which are hereby incorporated by reference in their entirety.

TECHNICAL FIELD

Embodiments of the disclosure relate generally to a multi-threaded, declarative language (also referred to as declarative engine for workloads or DEW) with functionalities for authoring script files and including a runtime for workload and control flow execution, including functionalities for configuring resilience testing using DEW.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

With the rapid growth of application frameworks including cloud-based database technology and other applications technology and products, stability and resiliency become critical factors for each system component in addition to the overall deployment. As application frameworks will occasionally fail or malfunction without warnings, robust and comprehensive resilience plans at each level (e.g., feature, component, layer, and system-level) can be used to ensure such incidents do not cause service disruptions for customers and service providers. However, authoring varying, concurrent workloads to a deployment using concise syntax to express complex concurrencies for resilience testing (or for performing other data processing tasks) can be time-consuming.

BRIEF DESCRIPTION OF THE DRAWINGS

The present disclosure will be understood more fully from the detailed description given below and from the accompanying drawings of various embodiments of the disclosure.

FIG. 4 illustrates example periodic containers which can be used in a DEW script file for periodic execution of tasks, in accordance with some embodiments of the present disclosure.

FIG. 7, FIG. 8, FIG. 9, and FIG. 10 illustrate example configuration (or config) blocks that can be used by an in-memory execution plan, in accordance with some embodiments of the present disclosure.

DETAILED DESCRIPTION

Figure 1:
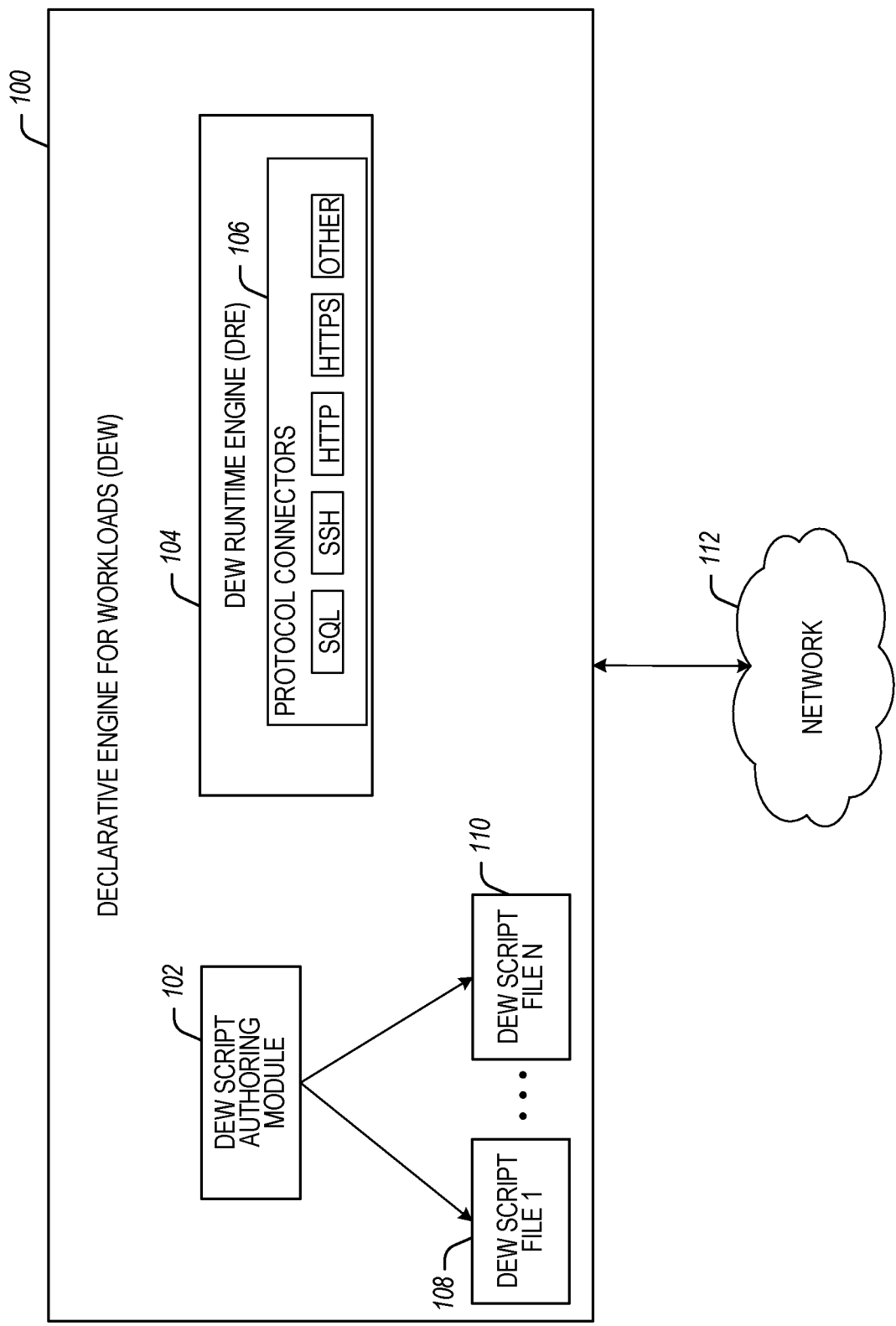
FIG. 1 illustrates a block diagram of a declarative engine for workloads (DEW) with a DEW script authoring module and a DEW runtime engine (DRE), in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The disclosed techniques can be used to configure a declarative engine for workloads (DEW) as a framework providing capabilities for authoring various types of scripts (also referred to as DEW scripts or DEW script files) as well as a DEW runtime engine to execute such scripts. In some aspects, a DEW script allows the expression of complex concurrencies with a syntax that more closely matches workload authoring models. More specifically, the disclosed DEW framework can be used to express (e.g., without code) a complex mix of parallelism and periodic actions without knowledge of concurrency techniques (such as threads and co-routines).

In example embodiments, the disclosed DEW framework can be used for generating a DEW script specifying a plurality of tasks for serial and/or parallel execution using, e.g., declarative expressions, programmatic expressions, or a combination of both. The order of execution of the tasks can be specified in the DEW script as well. A declarative expression can use a simple markup to express desired functionalities (e.g., to declare what functions will be performed when the tasks are executed). A programmatic expression of the tasks uses code to describe how the functions associated with the tasks work, what is the sequence of performing the functions, or both. In some aspects, the declarative expression in DEW scripts is used for performing workloads, and the programmatic expression of the tasks is used to perform failure experiments in connection with resilience testing.

As discussed herein, the term "persistent storage" refers to a data storage device that retains data after power to that device is shut off. As discussed herein, the term "pod" refers to a set of containers (e.g., executing on a cluster) that accesses shared resources (e.g., network, storage), and one or more pods can be executed by a given computing node. As discussed herein, the terms "cluster" and "container environment" are used interchangeably to indicate a set of compute nodes (e.g., worker machines or worker nodes) that run containerized applications. In some aspects, a cluster has at least one worker node. As discussed herein, the term "container" refers to an instance of a container image, and an application executes within an execution environment provided by the container. As used herein, the term "workload" indicates one or more queries (or requests) that can be executed in a container environment. As used herein, the term "failure experiments" (also referred to as "experiments") indicates a set of manipulations that alter one or more hardware or software settings of the testing deployment to trigger at least one network failure. As disclosed herein, workloads and failure experiments are part of a workflow, and a disclosed resilience testing manager is configured to perform resilience testing using such workflow.

The various embodiments that are described herein are described with reference where appropriate to one or more of the various figures. An example DEW framework with a DEW script authoring module and a DEW runtime engine is discussed in connection with FIG. 1. Various types of DEW script files with different task expressions are discussed in connection with FIG. 2-FIG. 5. In-memory execution plan generation and different types of blocks used in such plan are discussed in connection with FIG. 6-FIG. 10. Example operations during the execution of a DEW script file by a DEW runtime engine are discussed in connection with FIG. 11. Example use of the disclosed DEW framework in connection with resilience testing is discussed in connection with FIG. 12-FIG. 14. Example operations in performing a method for processing a script file using a DEW runtime engine are discussed in connection with FIG. 15. A more detailed discussion of example computing devices that may be used with the disclosed techniques is provided in connection with FIG. 16.

FIG. 1 illustrates a block diagram of a declarative engine for workloads (DEW) 100 with a DEW script authoring module and a DEW runtime engine (DRE), in accordance with some embodiments of the present disclosure. Referring to FIG. 1, DEW 100 can include a DEW script authoring module 102 and a DEW runtime engine (DRE) 104 with communication support (e.g., to connect to other computing nodes) using protocol connectors 106. Protocol connectors 106 can include Structured Query Language (SQL) (e.g., using a Java Database Connectivity (JDBC) API), Secure Shell Protocol (SSH) (e.g., using terminal connections), SSH (Terminal connections), Hypertext Transfer Protocol (HTTP), HTTP Secure (HTTPS), and can be extended to others.

In some embodiments, DEW 100 is configured as a programming language, with the DEW script authoring module 102 and the DEW runtime engine (DRE) 104 used as components used for executing a DEW-related project.

DEW 100 can be in communication with other computing nodes of a data processing architecture (e.g., in connection with a DEW script file execution) via network 112. Network 112 can include a wired network and/or a wireless network configured as an external network, an internal network, or a combination thereof.

The DEW script authoring module 102 comprises suitable circuitry, logic, interface, and/or code and is configured as a script authoring tool within the framework of DEW 100. More specifically, DEW script authoring module 102 can be used for authoring (or otherwise generating) DEW script files (also referred to as DEW scripts) 108, . . . , 110 used in connection with workflow processing (e.g., for performance and resilience testing as discussed in connection with FIGS. 12-14) or for other data processing tasks within a data processing architecture. In some aspects, module 102 is an integrated development environment (IDE) exemplified in FIG. 1 as a DEW script authoring module.

As described in greater detail in connection with FIGS. 2-5, each of the DEW scripts 108, . . . , 110 can define a plan to be executed, along with an optional configuration expressing formal inputs. In some aspects, the primary parts of a plan defined by a DEW script file are containers and tasks. The containers contain tasks or other containers. In some embodiments, containers within a DEW script file can be configured for serial, parallel, or periodic execution of the contained elements.

A task is a single action that can optionally return a value. Example tasks include query, sleep, and log, which are explained herein below. In some aspects, a DEW script file can define its tasks using code (e.g., Kotlin code), either inline inside the plan or as implementations of an interface. DEW 100 can be configured to provide various built-in tasks such as "query" (for executing a query), "ssh" (for executing OS-level commands on a remote Linux machine), and "http" (to send HTTP protocol requests to a web server). Additionally, DEW 100 can be configured and used for authoring customized tasks, either inline or outline.

A log task logs to log output. A log task may be constructed with a fixed string or with a function that will supply a string (e.g., java.util.Supplier<String> in Java terms, or ( )→String in Kotlin).

A sleep task can be used to cause a process to sleep for a given number of milliseconds. Similar to the log task, the sleep task can take either a constant Long amount of time or a ( )→Long lambda. The sleep task can also take a Kotlin IntRange or LongRange that defines a range that will be used for a random number. The lower element can be inclusive and the upper element can be exclusive.

A query task can be used for the execution of a query using a connection source defined in a config block. Similar to the log task, the query task may accept a static String or a lambda that provides a String, that is a ( )→String in Kotlin.

In some aspects, DEW 100 may also configure additional tasks as well, including a system task (e.g., for calling an external command), a shell task (e.g., a shell passes the supplied string to run and captures the exit status), etc.

A plan can be described programmatically or declaratively, as parallel and/or serially executed containers of a plurality of tasks, using features of a programming language (e.g., Kotlin) that allow it to read as a domain-specific language (DSL) script. When executed by a DEW runtime engine (e.g., DRE 104), the plan is constructed first into memory, then executed (e.g., as described in greater detail in connection with FIG. 11). The execution of the plan can be configured as an implicit action that happens at the end of the script. A more detailed description of functionalities performed during a DEW script file execution is provided in connection with FIG. 11.

The disclosed techniques associated with functionalities of the DEW script authoring module 102 and DRE 104 allow the expression of complex concurrency with a syntax that more closely matches the mental model of someone writing a workload. In this regard, a user can express, without code, a complex mix of parallelism and periodic actions without any knowledge of any traditional concurrency techniques (e.g., threads, coroutines, etc.). Additional benefits of the DEW script authoring module 102 and DRE 104 include the following:

(a) Concise syntax (scripts can be written using DEW 100 with less code compared to other techniques);

(b) Expressive syntax (DEW 100 can be used to express a rich set of possible workloads, expressing common patterns of sequences, concurrent actions, periodic requests, and combinations thereof);

(c) Flexibility (DEW 100 may be used to write explicit code for a workload that integrates with the RTM and does not require a separate authoring environment (e.g., call a shell script);

(d) Performant (DEW 100 can be used to create a high load on a test deployment without requiring undue amounts of computing resources). For example, by using Kotlin as the scripting language, improved thread and memory management can be achieved when using DEW 100. Additionally, connection pool management is improved (e.g., creating connections to test deployments is performed more efficiently, without exhausting connection pool resources). In some aspects, the DEW runtime engine manages pools of resources when executing a DEW script (e.g., pools of memory, network resources, etc.), manages the number of CPU threads to use, which memory to use, etc.

Figure 12:
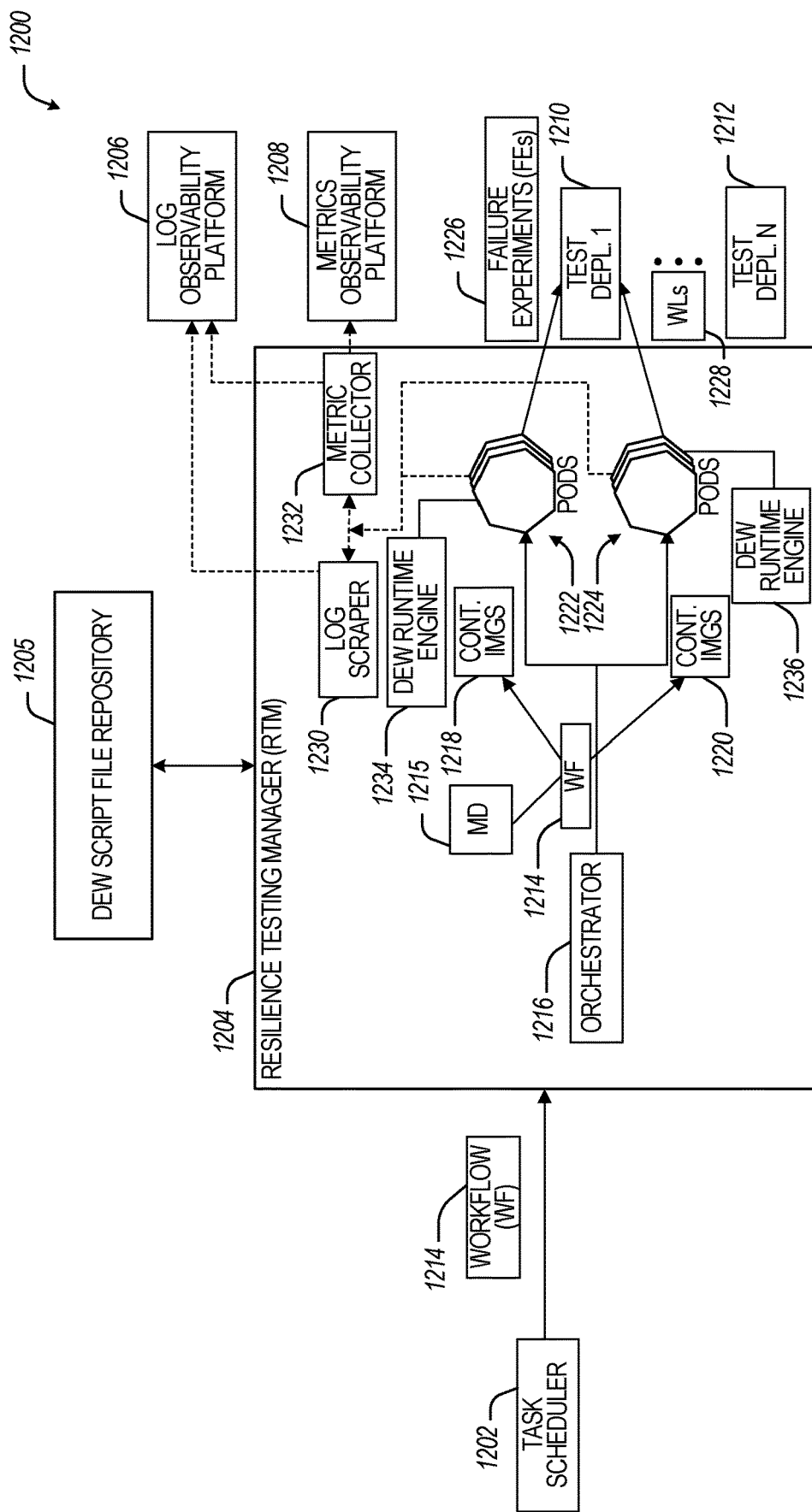
FIG. 12 is a block diagram of a resilience testing manager using the disclosed DEW runtime engine to execute DEW script files in connection with resilience testing, in accordance with some embodiments of the present disclosure.

(e) Concurrency (using DEW 100 to author scripts allows for the expression of complex concurrency with a syntax that more closely matches the mental model of someone writing a workload); and (f) Integration (DEW 100 can be configured to function together with existing logging and metric repositories, such as the log observability platform 1206 and the metrics observability platform 1208 in FIG. 12).

Figure 2:
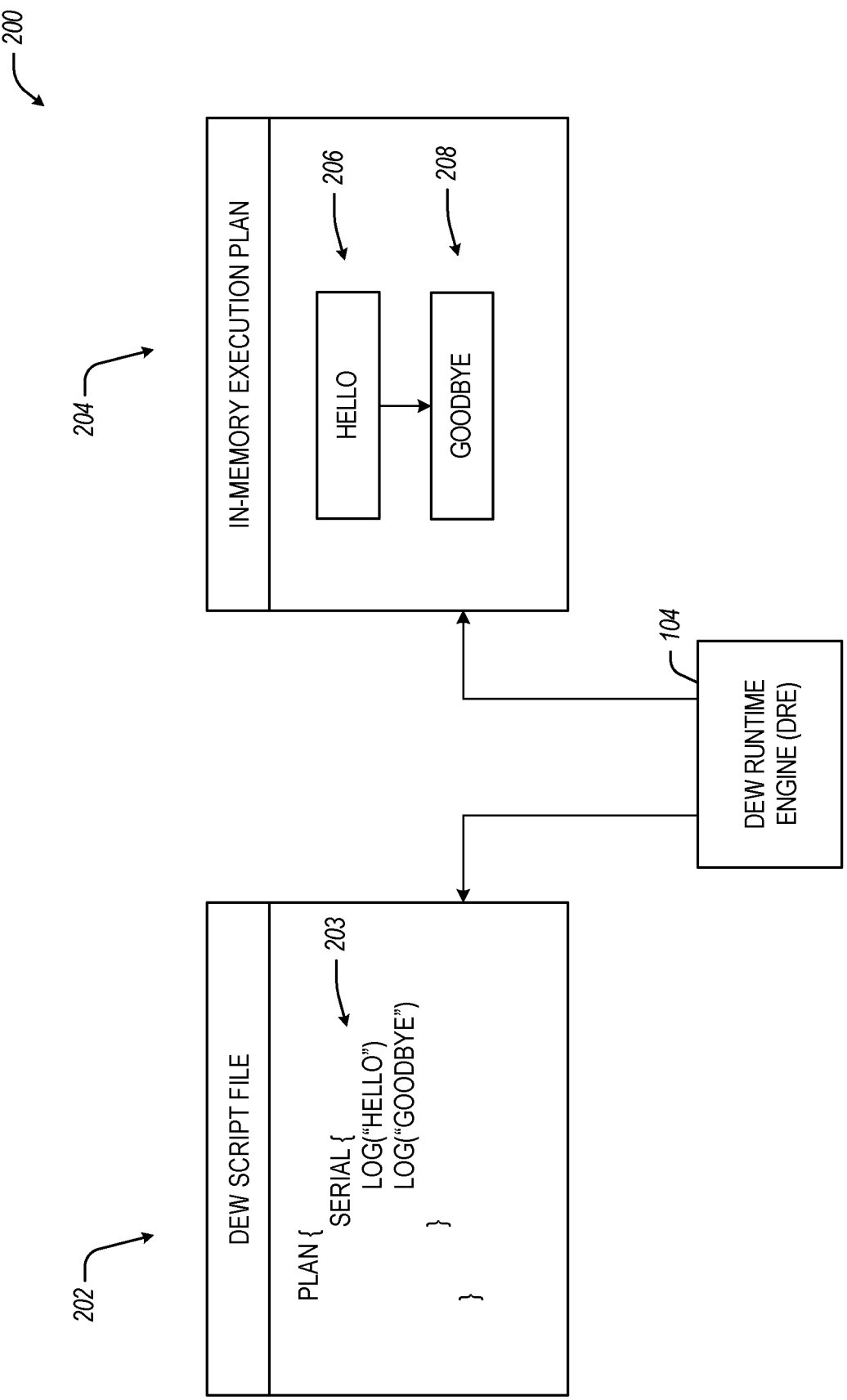
FIG. 2 illustrates an example DEW script file with a declarative expression of a plurality of tasks associated with serial execution, in accordance with some embodiments of the present disclosure.

FIG. 2 illustrates a diagram 200 of an example DEW script file with a declarative expression of a plurality of tasks associated with serial execution, in accordance with some embodiments of the present disclosure. More specifically, FIG. 2 illustrates a DEW script file 202 which includes a plan (e.g., a container) with tasks 203 configured for serial execution. During the execution of the DEW script file 202 by DRE 104, an in-memory execution plan 204 is generated, which can be configured as a directed acyclic graph (DAG). In this regard, the DAG includes task representations 206 and 208 of tasks 203 from the plan of the DEW script file 202.

Referring to FIG. 2, task "plan" is the outer container that contains other constructs. The illustrated "plan" can contain a single child container, which is configured for serial execution as illustrated in FIG. 2. "Serial" is a container that executes the contained tasks 203 in order, one after the other (i.e., serially). In some aspects, "log" is a built-in task, which when executed, logs the given message. In some aspects, since the plan of a DEW script file includes containers indicating serial, parallel, or periodic execution of the contained tasks, the DEW script file can be considered to also indicate an order of execution of the contained tasks implicitly. Such order of execution can be used in generating the DAG (e.g., illustrated as in-memory execution plan 204) and configuring the proper connections between the task representations within the DAG.

Figure 3:
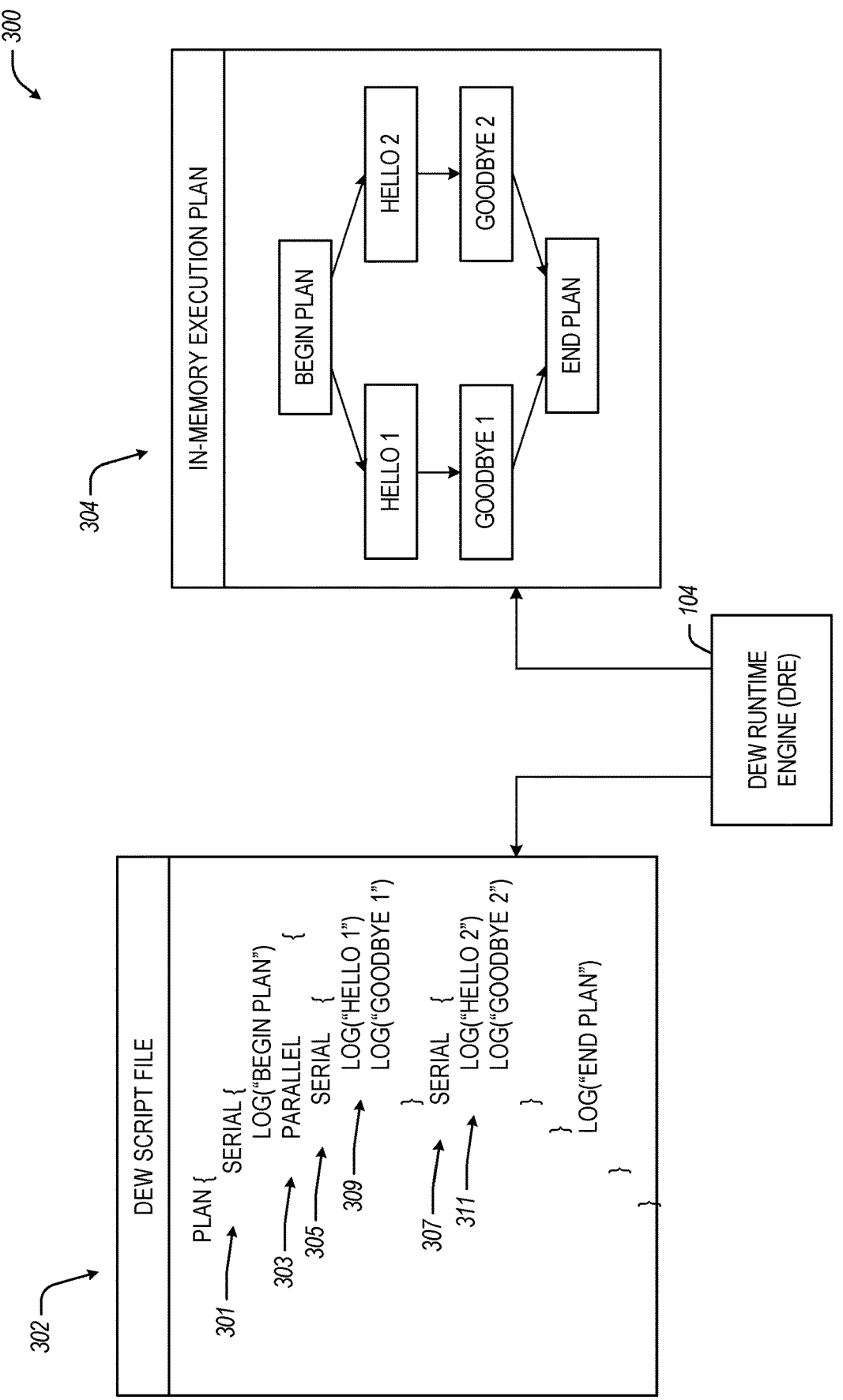
FIG. 3 illustrates an example DEW script file with a declarative expression of a plurality of tasks associated with serial and parallel execution, in accordance with some embodiments of the present disclosure.

FIG. 3 illustrates a diagram 300 of an example DEW script file with a declarative expression of a plurality of tasks associated with serial and parallel execution, in accordance with some embodiments of the present disclosure. More specifically, FIG. 3 illustrates an example DEW script file 302 with a plan with nested containers. The serial container 301 with serial log statements includes a parallel container 303 containing two serial containers 305 and 307. Serial container 305 includes tasks 309, and serial container 307 includes tasks 311.

During the execution of the DEW script file 302 by DRE 104, an in-memory execution plan 304 is generated, which can be configured as a DAG. In this regard, the DAG includes task representations of the tasks of the serial container 301 with nested containers. After the DAG is generated, DRE 104 can execute each of the serial containers concurrently, yet the contents of each will proceed serially. The "begin plan" and "end plan" log statements are children of the outermost serial container and will be executed around the parallel block. In some aspects, a parallel block is complete when all of its contained items are complete.

In some aspects, a DEW script file can use a serial container to execute each contained item in the order, one at a time, as if on a single thread. In some aspects, the contained items may execute on different threads, but the items will run in order and not simultaneously.

In some aspects, a DEW script file can use a parallel container. Each item (task or another container) in a parallel block will run as soon as possible, each on its thread. In some aspects, when constructing a parallel block, a maxConcurrency parameter may be used for guaranteeing that at most that many children items will be executing concurrently.

FIG. 4 illustrates example periodic containers 402 and 404 which can be used in a DEW script file for periodic execution of tasks, in accordance with some embodiments of the present disclosure.

In some aspects, a periodic container allows the execution of tasks at a specified time interval. A periodic container can contain only one other container, which defines the actions that will happen at each interval. Nesting of containers can be used for configuring complex behavior. In some aspects, the following types of intervals may be defined—fixed or random. A fixed interval will cause performing tasks at the exact time that is defined. A random interval will cause scattering of the execution times randomly in the total interval to achieve the same total number of occurrences in the same total amount of time. In some aspects, each periodic action will run at the given time, even if the previous action is still running (this processing can be used for avoiding coordinated omission).

Referring to FIG. 4, periodic container 402 can be used for logging "action" every 100 milliseconds, 3 times. Periodic container 404 can be used for running the given query at 10 random times in the interval now to now +90 ms. In some aspects, instead of specifying a count, a total duration (e.g., totalDuration) can be specified in a periodic container.

In some aspects, a DEW script file can use a session container that supplies a single connection to use for all contained query tasks. A session container otherwise acts as a serial container with the restriction that execution of all contained items may not contain concurrent containers. This means that a session container may only contain serial or session containers. This limit is recursive down the tree of contained items and in some embodiments may be removed.

Figure 5:
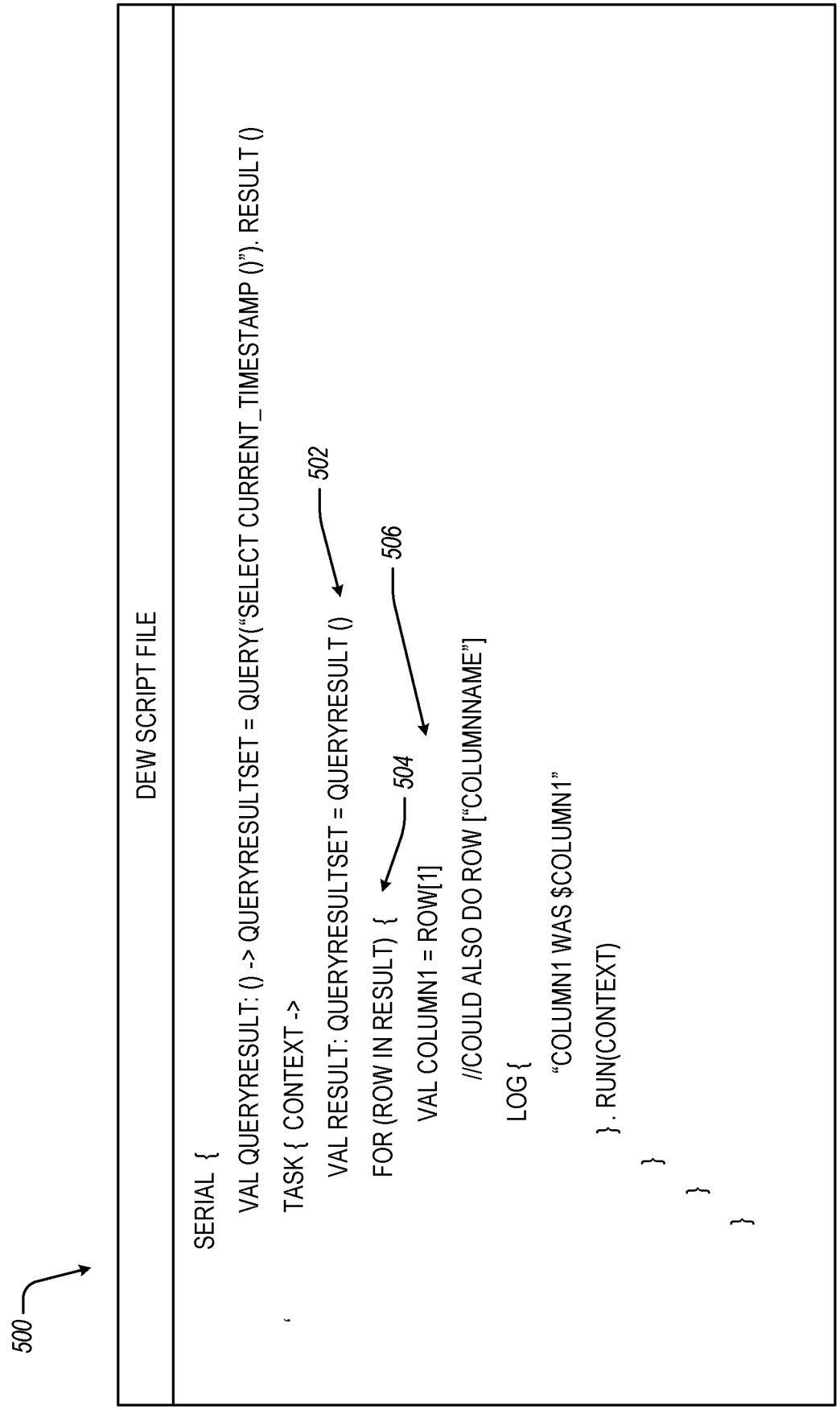
FIG. 5 illustrates an example DEW script file with a programmatic expression of a plurality of tasks, in accordance with some embodiments of the present disclosure.

FIG. 5 illustrates an example DEW script file 500 with a programmatic expression of a plurality of tasks, in accordance with some embodiments of the present disclosure. In some embodiments, a DEW script includes programmatic code that can describe how a function works, programmatic code that indicates sequences of performing functions, or both. Referring to FIG. 5, DEW script file 500 includes code 502 for specifying a variable, code 504 to perform a "for" loop, and additional programmatic code 506 to perform other functions.

Figure 6:
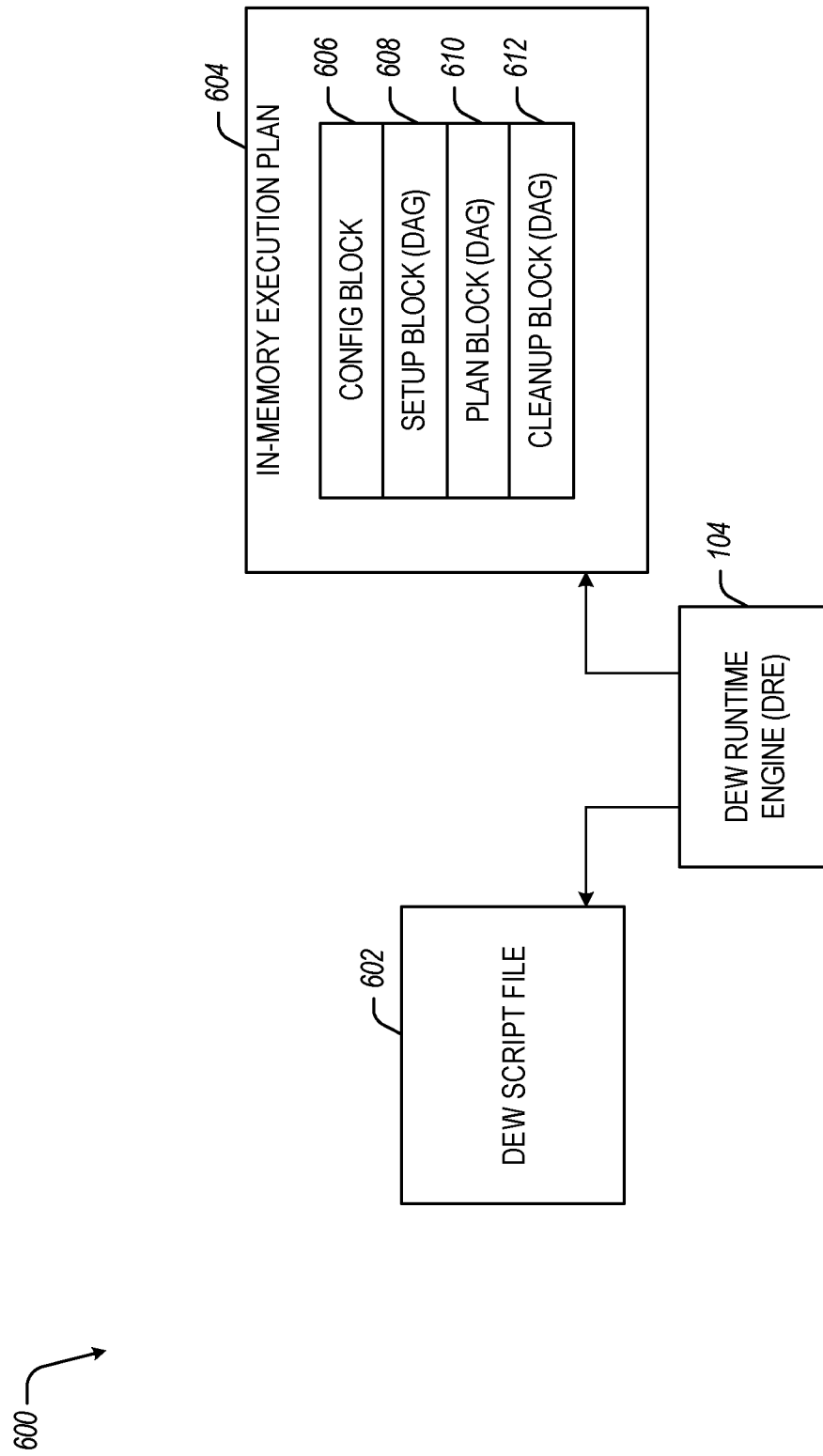
FIG. 6 illustrates the generation of an in-memory execution plan using a DEW script file, in accordance with some embodiments of the present disclosure.

FIG. 6 illustrates a diagram 600 of the generation of an in-memory execution plan using a DEW script file, in accordance with some embodiments of the present disclosure. Referring to FIG. 6, a DEW script file 602 can be generated using the DEW script authoring module 102 and can be executed using the DRE 104. During execution (which is illustrated in greater detail in FIG. 11), an in-memory execution plan 604 is generated. The in-memory execution plan can include a configuration (or config) block 606, a setup block 608, a plan block 610, and a cleanup block 612. One or more of the config block 606, the setup block 608, the plan block 610, and the cleanup block 612 can be configured as a DAG.

In some aspects, the DEW script file 602 can include a plan (e.g., as illustrated in FIGS. 2-5) with multiple containers and tasks, which can be used for generating the config block 606, the setup block 608, the plan block 610, and the cleanup block 612. The config block 606 can include parameters and inputs to the steps executed by the plan block 610. In some aspects, resources that are declared and configured by config block 606 can be used by the plan block 610 (e.g., JDBC connection pool, metrics recorder, etc.). The setup block 608 can include initial steps which can be executed before the main steps associated with the plan block 610. The cleanup block 612 includes steps that can be performed after the main steps associated with the plan block 610 (e.g., temporary data removal, etc.).

In some aspects, multiple setup and cleanup blocks may exist inside the plan of a DEW script file. Before the plan is run (e.g., as plan block 610 is configured as a DAG), each setup block (e.g., setup block 608) is run in the order they are defined in the plan of the DEW script file. A failure of any setup block can cause the script to exit with a non-zero exit status. In some aspects, a setup block can contain exactly one container. In some aspects, a setup block may not contain config block elements. In some aspects, a setup block can contain any tasks and constructs that may be present in the main plan (e.g., plan block 610).

Cleanup blocks (e.g., cleanup block 612) follow the same rules as setup blocks in how they are constructed. After the main plan (e.g., plan block 610) is run, each cleanup block is also run. Any errors in one block will not prevent the other cleanup blocks from running. In some aspects, cleanup block failures do not affect the exit status of the process.

FIG. 7, FIG. 8, FIG. 9, and FIG. 10 illustrate example configuration (or config) blocks that can be used by an in-memory execution plan, in accordance with some embodiments of the present disclosure.

In some aspects, a plan may contain any number of config blocks as immediate children. A config block may define resources for use by tasks in the script. Two types of resources can be supported by a config block—duration recorders and database connections. Each of these types has multiple variations.

In some aspects, a duration recorder defines an object that serves as a place to record the duration of a task or a container. The following three built-in types of duration recorder can be defined in a DurationRecorderType enum:
(a) LOG_BASIC_SUMMARY, which is a wrapper around java.util.LongSummaryStatistics that records basic stats and logs them at the end of the plan;
(b) HDR_HISTOGRAM, which records each duration into an hdr histogram that dumps its results (at plan exit) into a tmp file for later analysis; and
(c) STATSD_TIMER, which pushes a timing metric to a statsd endpoint.

Referring to FIG. 7, config block 700 is an example showing two ways to use a recorder, either by reference to a recorder object or by Stringlookup. In all cases, a durationRecorder call may be needed in the config block.

Referring to FIG. 8, config block 802 uses a statsd recorder. In aspects associated with statsd recorders, by default, the statsd output goes to localhost:8125. There are command-line options to control the host and port. For a recorder named "stat1," recording an event that took 6 milliseconds, statsd will see: stat1:6|ms. In some aspects, it is possible to add tags to a statsd recorder such that those tags are included with every metric value sent using that recorder. In some aspects, the receiving statsd server may support tags else the message may be rejected.

Referring to FIG. 8, config block 804 can be used in connection with plotting Hdr recorders results. Config block 804 can be used for configuring plotting the hdr histogram results at the end of the run. This functionality can be configured by adding a directive into the config section as illustrated by config block 804 in FIG. 8. By default, hdrPlot will open a new browser window or tab with the results. Adding.disableOpen( ) will prevent the plot from being opened, but the HTML, file will still be generated into a temporary directory.

In some aspects, a database connection defines a way for query tasks and session containers to obtain a database connection. There are two ways to define a database connection—dbConnectionSource (e.g., as illustrated by the config block 900 in FIG. 9) or dbConnectionPool (e.g., as illustrated by the config block 1000 in FIG. 10).

Referring to FIG. 9, when a defined dbConnectionSource is asked for a connection (either by a query task or by a session container), it will provide a new database connection. This connection will be closed at the end of the query or session container.

Referring to FIG. 10, a dbConnectionPool can use a JDBC connection pool to avoid the overhead of creating a connection. When a defined connectionPool is asked for a connection, it will return a cached connection from the pool. If none are available and the total connection count is less than the configured max, another connection will be created and used, otherwise, the connection request will block until a connection is available. The maxConnections variable can be unique to the connectionPool and can define the maximum number of connections in the pool.

Figure 11:
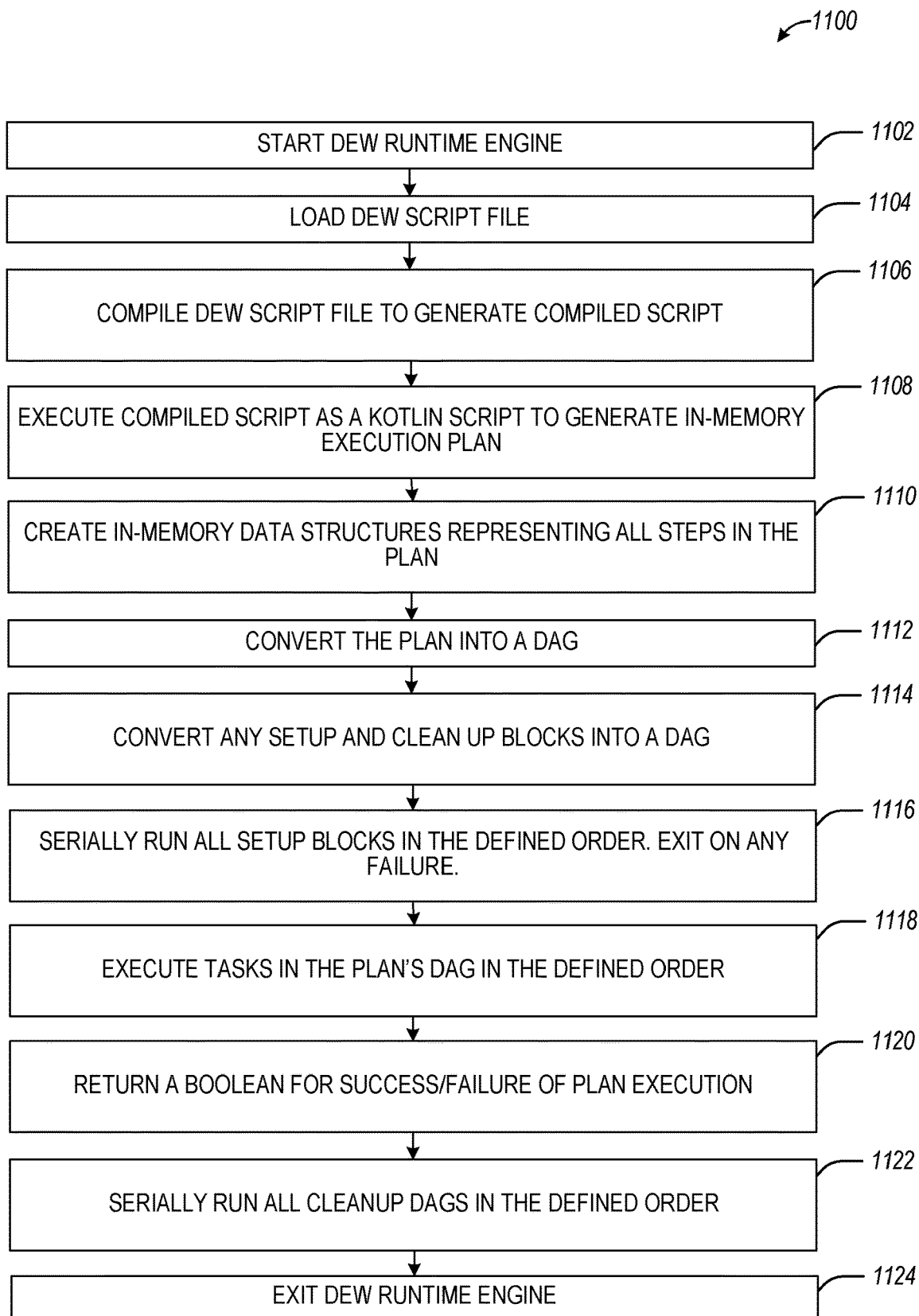
FIG. 11 is a flow diagram illustrating operations during the execution of a DEW script file by a DEW runtime engine, in accordance with some embodiments of the present disclosure.

FIG. 11 is a flow diagram 1100 illustrating operations performed during the execution of a DEW script file by the DEW runtime engine 104, in accordance with some embodiments of the present disclosure. At operation 1102, the DEW runtime engine 104 is started. At operation 1104, a DEW script file (e.g., DEW script file 602) is loaded. At operation 1106, the DEW script file is compiled to generate a compiled script. At operation 1108, the compiled script is executed (e.g., as Kotlin script) to generate an in-memory execution plan (e.g., in-memory execution plan 604). At operation 1110, in-memory data structures are created which represent all steps in the plan associated with the DEW script file. For example, the main steps of the plan of DEW scripts file 602 are configured as plan block 610. Any config, setup, and cleanup steps are converted into corresponding config block 606, setup block 608, and cleanup block 612.

At operation 1112, the plan is converted into a DAG. For example, plan block 610 can be converted into a DAG. At operation 1114, any setup and cleanup blocks are also converted into a DAG. For example, setup block 608 and cleanup block 612 are converted into DAGs. At operation 1116, all setup blocks are serially run in the defined order (e.g., the order indicated by the DEW script file plan and considered when the DAGs are generated). Processing may exit upon any detected failure.

At operation 1118, the tasks in the plan's DAG (e.g., tasks in the DAG of plan block 610) are executed in the order defined by the DAG. At operation 1120, a Boolean for success or failure of the plan execution is returned. At operation 1122, all cleanup DAGs are serially run in the defined order. At operation 1124, an exit of the DEW runtime engine is performed.

In some embodiments and as discussed in connection with FIG. 12—FIG. 14, the disclosed techniques can also be used to generate DEW script files which can be used to simulate workloads and failure experiments scenarios in application deployment, as well as to collect metrics and measure the impact of such workloads, failure experiments, and other failure scenarios during data processing. Example failure scenarios include one or more of the following types of failures: operating system (OS) level failure (e.g., memory full, disk failure), service level failure (e.g., specific service failures such as warehouse malfunctioning), Cloud environment level failure (e.g., inter-process communications disruption on the same network node, computing process disruption, CPU saturation, etc.). In some embodiments, resilience testing techniques can enable cloud computing platform feature owners to compose, and run, scalable end-to-end (E2E) workloads against a target environment (such as a test deployment using an execution node) in a declarative manner using scripts (e.g., DEW script files) generated by the DEW script authoring module 102 and executed by DRE 104. In some aspects discussed in relation to FIG. 12, the components of the overall workload are executed across a distributed set of machines (e.g., a set of containers forming a pod), and allow the overall workload to scale beyond the typical limits of a single software/single test node configuration. In some embodiments, the workloads are composed of smaller, more modular, workloads for re-use.

FIG. 12 is a block diagram 1200 of a resilience testing manager (RTM) using the disclosed DEW runtime engine to execute DEW script files in connection with resilience testing, in accordance with some embodiments of the present disclosure. Referring to FIG. 12, RTM 1204 may be in communication with a task scheduler 1202, a log observability platform 1206, metrics observability platform 1208, and test deployments 1210, . . . , 1212. RTM 1204 may include an orchestrator 1216, a log scraper service 1230, and a metric collector service 1232.

The task scheduler 1202 is configured to generate a workflow 1214 which is communicated to orchestrator 1216 for processing in connection with resilience testing.

In some aspects, workflow 1214 can include a plurality of workflow steps. Each of the workflow steps can include declarative metadata such as a runtime engine identifier and a scripts identifier. For example, a workflow step includes declarative metadata, which can be composed of a runtime engine identifier and script identifier. The script identifier in the declarative metadata of a workflow step identifies at least one script (e.g., at least one of the DEW script files 108, . . . , 110) which can be accessed from the DEW script repository 1205. The runtime engine identifier associated with a workflow step identifies a type of runtime engine which can be used to execute the identified at least one script. In an example embodiment, the at least one script is a DEW script (also referred to as a DEW script file) and the identified runtime engine is the DRE 104 which can be used to execute the DEW script.

In an example embodiment, a DEW script used in a workflow step can include a declarative expression of a plurality of tasks (e.g., tasks configured for serial execution, parallel execution, or a mixture of both), a programmatic expression of the plurality of tasks, or a mixture of both (e.g., as discussed in connection with FIGS. 2-11).

RTM 1204 can be used for developing and running resilience (or "chaos") experiments (also referred to as failure experiments) as well as performance testing against an application under test (or AUT) which can be configured in one or more of the test deployments 1210, . . . , 1212. Performance testing can include workload execution, which can be performed at the same time or separately from the failure experiments. In some aspects, RTM 1204 is configured to test any application represented by the AUT under unusual or hard-to-predict circumstances. RTM 1204 can be configured as a free-standing (or peer) system concerning AUT. Additionally, RTM 1204 may be running in a different cloud provider region compared to the AUT, a different cloud provider altogether, or another solution that hosts/runs a service infrastructure. In some aspects, the AUT can include arbitrary software executing on a single machine or connected groups of machines and can be deployed within an on-premises lab, room, or datacenter, for example. AUT can include implementation with storage or without storage (e.g., GPU-based compute clusters). In some embodiments, the AUT can include a distributed software system such as a cloud data platform. In some aspects, the cloud data platform can include a three-tier database system configured with the following functionalities: data storage, an execution platform, and a compute service manager providing cloud services. The database system can be configured to host and provide data reporting and analysis services to multiple client accounts.

Orchestrator 1216 reads workflow 1214 to obtain a plurality of workflow steps, where each workflow step includes declarative metadata. The declarative metadata 1215 can include a runtime engine identifier and a script identifier. Orchestrator 1216 retrieves a script from the script repository 1205 for a workflow step of the plurality of workflow steps based on the script identifier. In some aspects, the retrieved script is a DEW script generated by DEW 100 and specifies a plurality of tasks. In some aspects, orchestrator 1216 configures one or more containers with a runtime engine based on the runtime engine identifier in the declarative metadata. In some aspects, a workflow step associated with workflow 1214 identifies a DEW script associated with a plurality of container images (e.g., container images 1218, . . . , 1220), where each container image configures at least one failure experiment or at least one workload specified by the DEW script. Orchestrator 1216 is further configured to translate a descriptive configuration (e.g., as may be specified by the declarative metadata 1215) into multiple executable commands (or queries), and sends them to workers (e.g., pods of containers 1222 and 1224) for execution against a test deployment (e.g., test deployment 1210). In some aspects, the runtime engine identifier in the declarative metadata of the workflow steps can indicate that a DEW runtime engine is requested for the execution of the identified script. In this case, orchestrator 1216 configures the pods of containers 1222 and 1224 with corresponding DEW runtime engines 1234 and 1236, which can be used for the execution of the DEW script associated with the workflow steps. Orchestrator 1216 can then execute the script using runtime engines 1234 and 1236 against the pods of containers 1222 and 1224 to perform the plurality of tasks (e.g., workload tasks or failure experiments tasks).

In some aspects, task scheduler 1202 configures workflow 1214 as a Jenkins job (also referred to as a "workflow job" or a "job") which is used as a trigger for initiating a resiliency test using the workflow. For example, when a Jenkins job starts, workflow 1214 (e.g., describing workloads and failure experiments of a resiliency test) is communicated to RTM 1204 for execution. In other aspects, non-Jenkins build tools may be used for control/secure (present)/audit (log) and oversee the execution of workflow 1214.

In some aspects, the functionalities illustrated in FIG. 11 are performed when orchestrator 1216 executes a script of a workflow step.

In some embodiments, workloads 1228 are sent from test environments for execution against isolated environments (e.g., one of the test deployments 1210, . . . , 1212) or non-isolated environments. For different workflows, different types of workloads may be used (e.g., read-only workloads, write-only workloads, etc.) or their combinations. Workloads 1228 may be executed for a pre-set period and scale.

In some embodiments, failure experiments 1226 are sets of manipulations configured for application to test deployment. For example, failure experiments 1226 can be used for scaling the deployment up or down and for triggering a network failure (e.g., draining memories or interrupting/terminating CPU processes, etc.). Like workloads, DEW 100 may be used to configure/author the failure experiments. In some aspects, RTM 1204 can use existing experiment implementations used in prior resilience testing.

Failure experiments 1226 can be configured to use specialized techniques to generate unplanned behavior in targeted components of a target deployment. In some aspects, failure experiments can include the following injection types for causing the unplanned behavior: SQL-based injection and OS-based injection.

In some embodiments, an SQL-based injection can be used for injecting faults into a test deployment. The failure experiment using an SQL-based injection can include control measures in place that allow limiting the impact when used. The SQL-based injection can have access to application contexts that can be used to scope when they fire. Example configurations for this injection include configurations for a pre-existing, secured fault injection framework, pre-existing fault-injection locations, using the framework, where actions can be performed, extensions to inject failures into subsystems, fault-injection locations, a better approximation of failure locations (e.g., manage calls to external dependencies), and fault-injection actions for a fault injection framework (e.g., perform JVM termination).

As these injections are SQL-based, a tool that can execute SQL can be used to trigger them. In some aspects, declarative and scripted options of a workload engine of the RTM 1204 can be used as the primary tool to inject SQL-based failures into a test deployment and to perform any necessary validation of the resulting state of the deployment.

In some aspects, the failure experiments 1226 can include an operating system (OS)-based injection. For example, certain experiment scenarios are better triggered using OS-level primitives. When these techniques are used, it may be more challenging to limit the impact of the injection as the application context may be missing.

In some aspects, an OS-based injection may be configured with a secured mechanism for use on a given instance or set of instances within the test deployment to perform one or more of block/disrupt disk input/output (I/O) (e.g., using Linux Kernel framework, Fuse, etc.); block/disrupt network connectivity; and resource overutilization (e.g., CPU, memory, storage). As such injections are OS-based, any script can introduce failure to the OS components. In some aspects, these scripts may be executable from the target instance, and any automated mechanisms for that may need to undergo suitable security scrutiny. In some aspects, each injection script may be configured to automatically reset the environment back to the original state after the injection is complete.

In some embodiments, after orchestrator 1216 obtains container images 1218, . . . , 1220, orchestrator 1216 determines failure experiments 1226 and workloads 1228 based on the retrieved scripts for each workflow step. Orchestrator 1216 configures the first set of containers 1222 (which can correspond to a first pod) with runtime engine 1234 and the second set of containers 1224 (which can correspond to a second pod) with runtime engine 1236 to execute against test deployment 1210. For example, orchestrator 1216 configures failure experiments 1226 (which can be associated with a first workflow step) to execute on the first set of containers 1222 while the workloads 1228 (which can be associated with a second workflow step) execute on the second set of containers 1224, all using test deployment 1210. In some embodiments, pods of containers 1222 and 1224 use a connector to connect to (e.g., using one or more different protocol connectors similar to protocol connectors 106 in FIG. 1) test deployment 1210 (e.g., to send a workload or send a command to cause a network failure scenario).

In an example embodiment, each test deployment of the available test deployments 1210, . . . , 1212 can be configured using at least one computing node.

Failure experiments can have a detrimental behavior on the test deployment upon which they are executed. When failure experiments are executed, they may mutate and/or otherwise damage the environment in which they run. In this regard, test deployments 1210, . . . , 1212 can be configured as isolated computing environments. For example, access by at least another workflow to compute and storage resources of the testing node of the test deployment can be isolated or controlled to configure the test deployment as an isolated computing environment. In some aspects, configuration changes to the testing node of the test deployment are monitored and reversed after the resilience testing configured by the workflow is completed. In other aspects, test deployments 1210, ..., 1212 can be configured as non-isolated computing environments.

In some embodiments, declarative metadata 1215 obtained from workflow 1214 can be configured for each workflow step in workflow 1214 and can include information for configuring execution of the failure experiments 1226 and the workloads 1228. In addition to the runtime engine identifier and the script identifier, declarative metadata 1215 can include a duration value (e.g., for configuring a duration of execution of the failure experiments 1226 or workloads 1228), a testing node specification (e.g., for selecting one of the test deployments 1210, ..., 1212 based on the testing node specification), specific indication on which failure experiments or workloads to execute, specific indication on which test deployment to use for the resilience testing, configurations for the first set of containers 1222 and the second set of containers 1224, etc. In some embodiments, declarative metadata 1215 can be stored in a metadata database used by the RTM 1204.

In some embodiments, RTM 1204 further uses the log scraper service 1230 to collect log data from the first set of containers 1222 and the second set of containers 1224 and store the log data for further processing in the log observability platform 1206. RTM 1204 also uses a metric collector service 1232 to collect metrics from the first set of containers 1222 and the second set of containers 1224 (e.g., metrics associated with the execution of the failure experiments 1226 and workloads 1228), which metrics are stored for further processing in the log observability platform 1206 and the metrics observability platform 1208.

Figure 13:
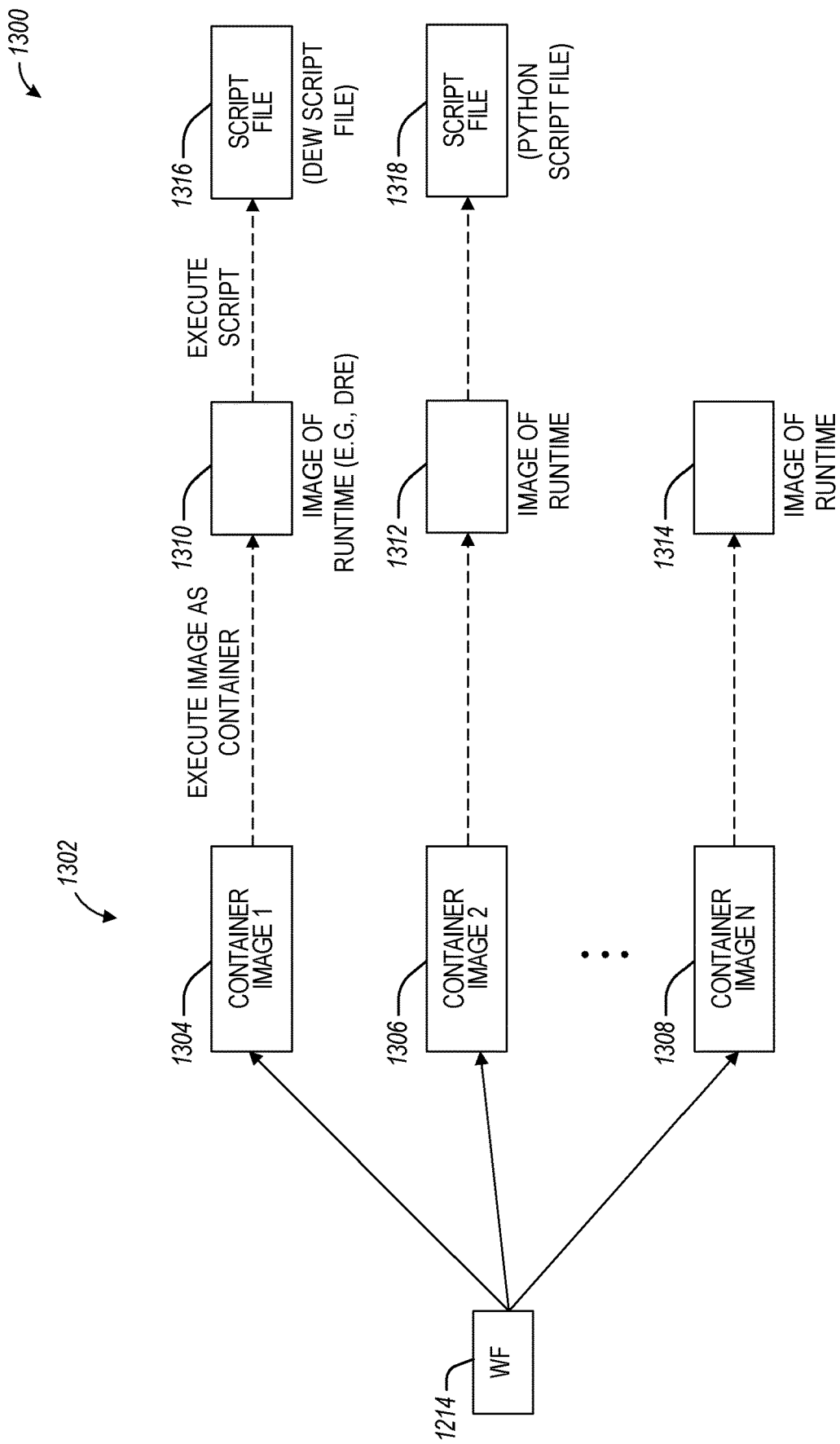
FIG. 13 is a block diagram illustrating an example workflow including multiple container images configured for execution, in accordance with some embodiments of the present disclosure.

FIG. 13 is a block diagram 1300 illustrating an example workflow including multiple container images configured for execution, according to some example embodiments. Referring to FIG. 13, workflow 1214 can include multiple container images 1302 associated with multiple workflow steps, which include container images 1304, 1306, ..., 1308 configured for execution by the RTM 1204. Each of the multiple container images 1302 can configure at least one failure experiment and/or at least one workload. In aspects when a single container image configures more than one task (associated with at least one failure experiment and/or at least one workload), the tasks can be executed in a serial and/or parallel manner.

In some embodiments, container images 1304, 1306, ..., 1308 can be executed as corresponding containers 1310, 1312, ..., 1314 in a set of containers (e.g., the first set of containers 1222 and the second set of containers 1224 in FIG. 12) against a test deployment (e.g., test deployment 1210 in FIG. 12).

In some aspects, the container images 1304, ..., 1308 are executed as corresponding containers by executing at least one pre-configured script. For example, container images 1304 and 1306 can be executed as corresponding containers 1310 and 1312 by executing corresponding scripts 1316 (e.g., a DEW script file executed by a DEW runtime engine such as DRE 104) and 1318 (e.g., a Python script file executed by a Python runtime engine).

In some embodiments, container images 1304, ..., 1308 associated with workflow 1320 are executed in parallel, as further illustrated in connection with FIG. 14.

Figure 14:
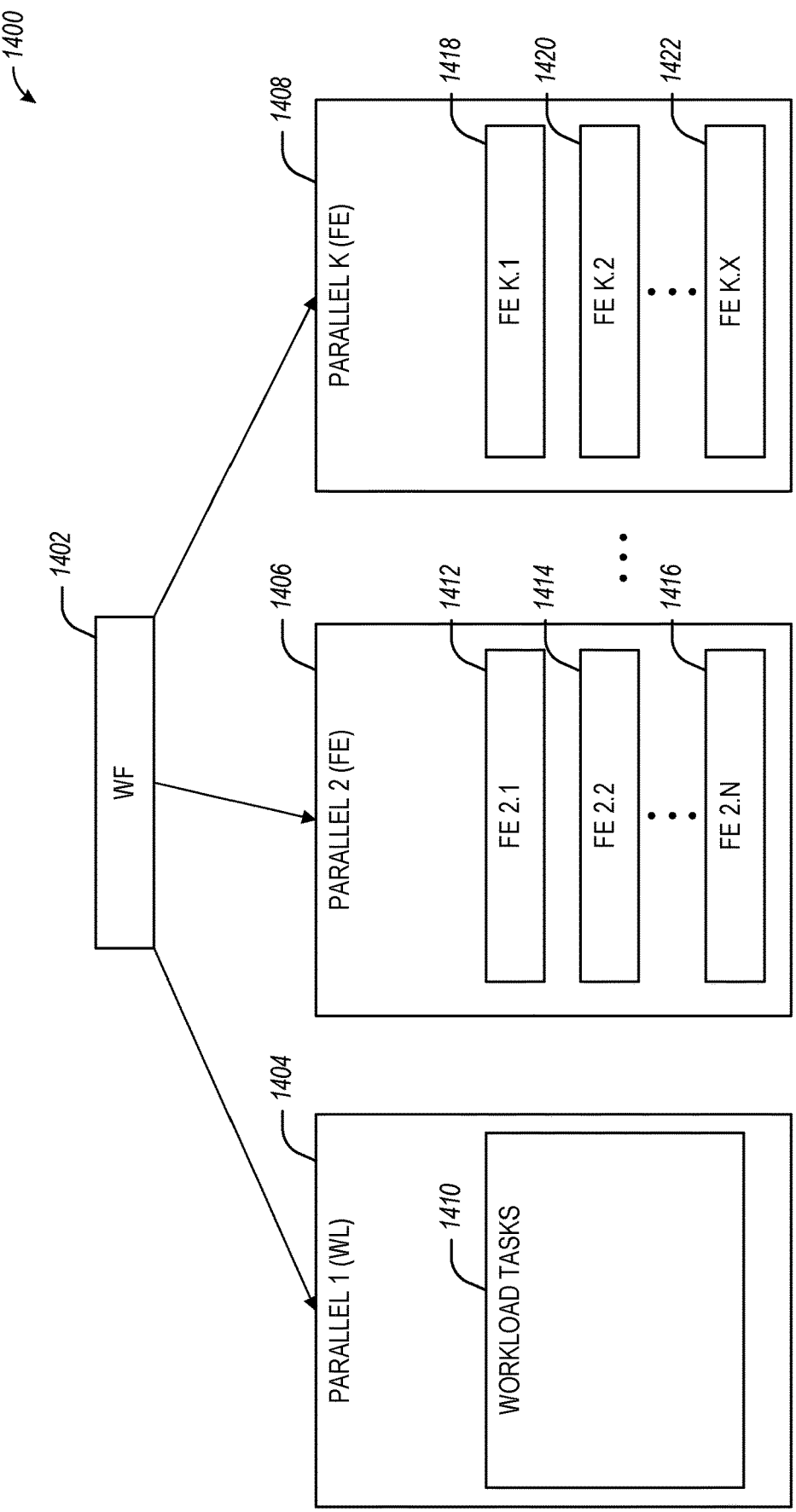
FIG. 14 is a block diagram illustrating the parallel execution of workload tasks and failure experiments in a test deployment, in accordance with some embodiments of the present disclosure.

FIG. 14 is a block diagram 1400 illustrating the parallel execution of workload tasks and failure experiments in a test deployment, in accordance with some embodiments of the present disclosure. Referring to FIG. 14, workflow 1402 may be parsed by orchestrator 1216 of RTM 1204 to determine workflow steps and corresponding one or more failure experiments and one or more workloads for execution on a test deployment (e.g., test deployment 1210 in FIG. 12) as parallel task sets 1404, 1406, ..., 1408. Task set 1404 can include multiple workload tasks 1410 specified by a script, which can be executed in a serial and/or parallel manner within task set 1404. Task set 1406 can include multiple failure experiments (or FEs) 1412, 1414, ..., 1416 which can be executed in a serial and/or parallel manner within task set 1406. Similarly, task set 1408 can include multiple failure experiments 1418, 1420, ..., 1422 which can be executed in a serial and/or parallel manner within task set 808.

Figure 15:
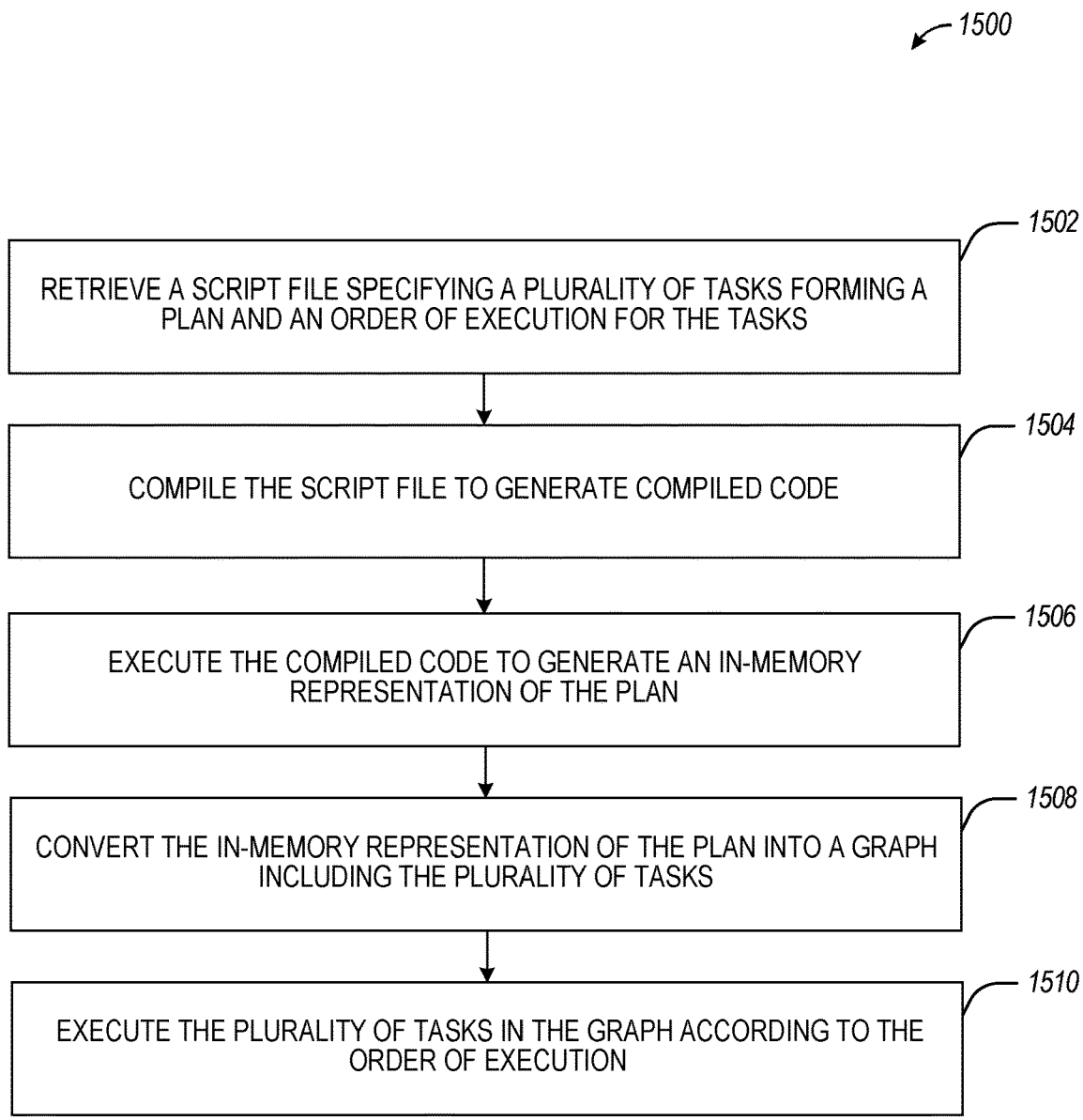
FIG. 15 is a flow diagram illustrating operations in performing a method for processing a script file using a DEW runtime engine, in accordance with some embodiments of the present disclosure.

FIG. 15 is a flow diagram illustrating operations in performing a method 1500 for processing a script file using a DEW runtime engine, in accordance with some embodiments of the present disclosure. Method 1500 may be embodied in computer-readable instructions for execution by one or more hardware components (e.g., one or more processors) such that the operations of the method 1500 may be performed by DRE 104 or components of the resilience testing manager 1204 implementing functionalities of DEW 100 (e.g., a network node which may be implemented as machine 1600 of FIG. 16 performing the disclosed functions and implementing functionalities of DEW 100). Accordingly, method 1500 is described below, by way of example with reference thereto. However, it shall be appreciated that method 1500 may be deployed on various other hardware configurations.

At operation 1502, a script file (e.g., DEW script file 602) is retrieved. The script file specifies a plurality of tasks forming a plan and an order of execution for the plurality of tasks. For example, and as illustrated in FIGS. 2-5, the DEW script file can include a plan specifying a plurality of tasks. The plan may specify containers configured for parallel and/or serial execution of tasks, which implicitly defines the order of execution of the tasks.

At operation 1504, the script file is compiled to generate compiled code. For example, and as illustrated in FIG. 11 (e.g., operation 1106), the DEW script file 602 is compiled to generate compiled code.

At operation 1506, the compiled code is executed to generate an in-memory representation of the plan. For example, and as illustrated in FIG. 11 (e.g., operations 1108 and 1110), the compiled code is executed to generate the in-memory execution plan 604. The in-memory execution plan includes a config block 606, a setup block 608, a plan block 610 (based on the main tasks of the plan associated with the DEW script file), and a cleanup block 612.

At operation 1508, the in-memory representation of the plan is converted into a graph, the graph including the plurality of tasks. For example, and as illustrated in FIG. 11 (e.g., operation 1112), the plan block 610 is converted into a DAG.

At operation 1510, the plurality of tasks in the graph are executed according to the order of execution. For example, and as illustrated in FIG. 11 (e.g., operation 1118), the tasks in the DAG are executed according to the defined order (e.g., the order used to generate the DAG with the representation of the tasks from the plan of the DEW script file).

In some embodiments, an example method for resilience testing using a DEW is described below and may be performed by components of the resilience testing manager 1204, such as a network node which may be implemented as machine 1600 of FIG. 16 performing the disclosed functions. Accordingly, the resilience testing method is described below, by way of example with reference thereto. However, it shall be appreciated that the resilience testing method may be deployed on various other hardware configurations.

During a first example operation of the resilience testing method, a workflow is decoded to obtain a plurality of workflow steps, each workflow step of the plurality of workflow steps comprising a runtime engine identifier and a script identifier. For example, orchestrator 1216 receives workflow 1214 including workflow steps. The workflow steps include corresponding runtime engine identifiers and script identifiers.

During a second example operation of the resilience testing method, a script for a workflow step of the plurality of workflow steps is retrieved based on the script identifier, the script specifying a plurality of tasks. For example, orchestrator 1216 retrieves a script (e.g., one of DEW scripts 108, . . . , 110) from script repository 1205.

During a third example operation of the resilience testing method, one or more containers with a runtime engine are configured based on the runtime engine identifier. For example, orchestrator 1216 configures containers 1222 and 1224 with corresponding runtime engines 1234 and 1236 based on the runtime engine identifier.

During a fourth example operation of the resilience testing method, the script is executed against the one or more containers using the runtime engine, to perform the plurality of tasks. For example, orchestrator 1216 executes the script using the corresponding runtime engines for containers 1222 and 1224.

In some embodiments, the script includes one or both of a declarative expression of the plurality of tasks and a programmatic expression of the plurality of tasks. In some aspects, the declarative expression is associated with the execution of the plurality of tasks as one or both of parallel executed workloads and serially executed workloads. In some embodiments, the programmatic expression includes programmatic code describing a sequence for performing the plurality of tasks. In some aspects, the programmatic code is executed to perform at least one failure experiment associated with the plurality of tasks.

In some aspects, the plurality of workflow steps includes a first subset of workflow steps associated with one or more workloads and a second subset of workflow steps associated with one or more failure experiments. In some aspects, at least a first container of the one or more containers is configured to execute the script for each of the one or more workloads on a testing node. In some aspects, at least a second container of the one or more containers is configured to execute the script for each of the one or more failure experiments on the testing node. Execution of the script for each of the one or more failure experiments triggers an error condition on the testing node.

In some aspects, a notification is generated based on at least one metric associated with the execution of the one or more workloads and the one or more failure experiments.

Figure 16:
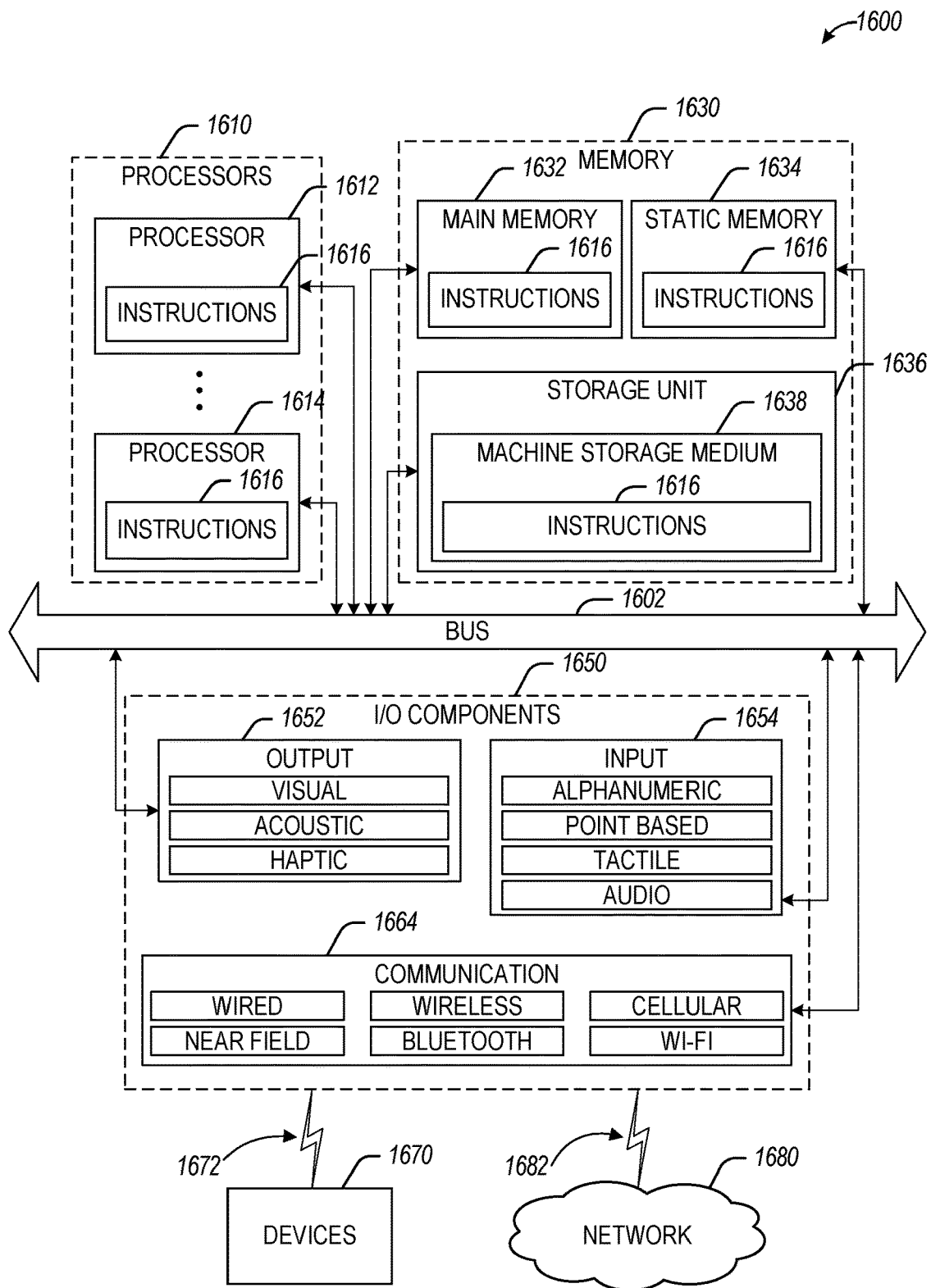
FIG. 16 illustrates a diagrammatic representation of a machine in the form of a computer system within which a set of instructions may be executed for causing the machine to perform any one or more of the methodologies discussed herein, in accordance with some embodiments of the present disclosure.

FIG. 16 illustrates a diagrammatic representation of a machine 1600 in the form of a computer system within which a set of instructions may be executed for causing the machine 1600 to perform any one or more of the methodologies discussed herein, according to an example embodiment. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example, instructions 1616 may cause machine 1600 to execute any one or more operations of method 1500 (or any other technique discussed herein, for example in connection with FIG. 1-FIG. 15). As another example, instructions 1616 may cause machine 1600 to implement one or more portions of the functionalities discussed herein. In this way, instructions 1616 may transform a general, non-programmed machine into a particular machine 1600 that is specially configured to carry out any one of the described and illustrated functions in the manner described herein. In yet another embodiment, instructions 1616 may configure a computing node to carry out any one of the described and illustrated functions in the manner described herein.

In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines 1600 that individually or jointly execute the instructions 1616 to perform any one or more of the methodologies discussed herein.

Machine 1600 includes processors 1610, memory 1630, and input/output (I/O) components 1650 configured to communicate with each other such as via a bus 1602. In some example embodiments, the processors 1610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1612 and a processor 1614 that may execute the instructions 1616. The term "processor" is intended to include multi-core processors 1610 that may comprise two or more independent processors (sometimes referred to as "cores") that may execute instructions 1616 contemporaneously. Although FIG. 16 shows multiple processors 1610, the machine 1600 may include a single processor with a single core, a single processor with multiple cores (e.g., a multi-core processor), multiple processors with a single-core, and multiple processors with multiple cores, or any combination thereof.

The memory 1630 may include a main memory 1632, a static memory 1634, and a storage unit 1636, all accessible to the processors 1610 such as via the bus 1602. The main memory 1632, the static memory 1634, and the storage unit 1636 store the instructions 1616 embodying any one or more of the methodologies or functions described herein. The instructions 1616 may also reside, completely or partially, within the main memory 1632, within the static memory 1634, within machine storage medium 1638 of the storage unit 1636, within at least one of the processors 1610 (e.g., within the processor's cache memory), or any suitable combination thereof, during execution thereof by the machine 1600.

The I/O components 1650 include components to receive input, provide output, produce output, transmit information, exchange information, capture measurements, and so on. The specific I/O components 1650 that are included in a particular machine 1600 will depend on the type of machine.

For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or another suitable device to interface with the network 1680. In further examples, the communication components 1664 may include wired communication components, wireless communication components, cellular communication components, and other communication components to provide communication via other modalities. The device 1670 may be another machine or any of a wide variety of peripheral devices (e.g., a peripheral device coupled via a universal serial bus (USB)).

The various memories (e.g., 1630, 1632, 1634, and/or memory of the processor(s) 1610 and/or the storage unit 1636) may store one or more sets of instructions 1616 and data structures (e.g., software) embodying or utilized by any one or more of the methodologies or functions described herein. These instructions 1616, when executed by the processor(s) 1610, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network, and the coupling 1682 may be a Code Division Multiple Access (CDMA) connection, a Global System for Mobile communications (GSM) connection, or another type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1616 may be transmitted or received over the network 1680 using a transmission medium via a network interface device (e.g., a network interface component included in the communication components 1664) and utilizing any one of several well-known transfer protocols (e.g., hypertext transfer protocol (HTTP)). Similarly, instructions 1616 may be transmitted or received using a transmission medium via coupling 1672 (e.g., a peer-to-peer coupling or another type of wired or wireless network coupling) to the device 1670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1616 for execution by the machine 1600, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: decoding a workflow to obtain a plurality of workflow steps, each workflow step of the plurality of workflow steps comprising a runtime engine identifier and a script identifier; retrieving a script for a workflow step of the plurality of workflow steps based on the script identifier, the script specifying a plurality of tasks; configuring one or more containers with a runtime engine based on the runtime engine identifier; and executing the script against the one or more containers using the runtime engine, to perform the plurality of tasks.

In Example 2, the subject matter of Example 1 includes subject matter where the script comprises one or both of a declarative expression of the plurality of tasks; and a programmatic expression of the plurality of tasks.

In Example 3, the subject matter of Example 2 includes subject matter where the declarative expression is associated with execution of the plurality of tasks as one or both of parallel executed workloads and serially executed workloads.

In Example 4, the subject matter of Examples 2-3 includes subject matter where the programmatic expression includes programmatic code describing a sequence for performing the plurality of tasks.

In Example 5, the subject matter of Example 4 includes subject matter where the at least one hardware processor further performs operations comprising: executing the programmatic code to perform at least one failure experiment associated with the plurality of tasks.

In Example 6, the subject matter of Examples 1-5 includes subject matter where the plurality of workflow steps comprise: a first subset of workflow steps associated with one or more workloads; and a second subset of workflow steps associated with one or more failure experiments.

In Example 7, the subject matter of Example 6 includes subject matter where the at least one hardware processor further performs operations comprising: configuring at least a first container of the one or more containers to execute the script for each of the one or more workloads on a testing node.

In Example 8, the subject matter of Example 7 includes subject matter where the at least one hardware processor further performs operations comprising: configuring at least a second container of the one or more containers to execute the script for each of the one or more failure experiments on the testing node, wherein execution of the script for each of the one or more failure experiments triggers an error condition on the testing node.

In Example 9, the subject matter of Example 8 includes subject matter where the at least one hardware processor further performs operations comprising: generating a notification based on at least one metric associated with execution of the one or more workloads and the one or more failure experiments.

In Example 10, the subject matter of Examples 1-9 includes subject matter where the at least one hardware processor further performs operations comprising: decoding the workflow to obtain a duration value and configuring a duration for execution of the script based on the duration value.

Example 11 is a method comprising: decoding, by at least one hardware processor, a workflow to obtain a plurality of workflow steps, each workflow step of the plurality of workflow steps comprising a runtime engine identifier and a script identifier; retrieving, by the at least one hardware processor, a script for a workflow step of the plurality of workflow steps based on the script identifier, the script specifying a plurality of tasks; configuring, by the at least one hardware processor, one or more containers with a runtime engine based on the runtime engine identifier; and executing, by the at least one hardware processor, the script against the one or more containers using the runtime engine, to perform the plurality of tasks.

In Example 12, the subject matter of Example 11 includes subject matter where the script comprises one or both of a declarative expression of the plurality of tasks; and a programmatic expression of the plurality of tasks.

In Example 13, the subject matter of Example 12 includes subject matter where the declarative expression is associated with execution of the plurality of tasks as one or both of parallel executed workloads and serially executed workloads.

In Example 14, the subject matter of Examples 12-13 includes subject matter where the programmatic expression includes programmatic code describing a sequence for performing the plurality of tasks.

In Example 15, the subject matter of Example 14 includes, executing the programmatic code to perform at least one failure experiment associated with the plurality of tasks.

In Example 16, the subject matter of Examples 11-15 includes subject matter where the plurality of workflow steps comprise: a first subset of workflow steps associated with one or more workloads; and a second subset of workflow steps associated with one or more failure experiments.

In Example 17, the subject matter of Example 16 includes, configuring at least a first container of the one or more containers to execute the script for each of the one or more workloads on a testing node.

In Example 18, the subject matter of Example 17 includes, configuring at least a second container of the one or more containers to execute the script for each of the one or more failure experiments on the testing node, wherein execution of the script for each of the one or more failure experiments triggers an error condition on the testing node.

In Example 19, the subject matter of Example 18 includes, generating a notification based on at least one metric associated with execution of the one or more workloads and the one or more failure experiments.

In Example 20, the subject matter of Examples 11-19 includes, decoding the workflow to obtain a duration value; and configuring a duration for execution of the script based on the duration value.

Example 21 is a computer-storage medium comprising instructions that, when executed by one or more processors of a machine, configure the machine to perform operations comprising: decoding, by at least one hardware processor, a workflow to obtain a plurality of workflow steps, each workflow step of the plurality of workflow steps comprising a runtime engine identifier and a script identifier; retrieving, by the at least one hardware processor, a script for a workflow step of the plurality of workflow steps based on the script identifier, the script specifying a plurality of tasks; configuring, by the at least one hardware processor, one or more containers with a runtime engine based on the runtime engine identifier; and executing, by the at least one hardware processor, the script against the one or more containers using the runtime engine, to perform the plurality of tasks.

In Example 22, the subject matter of Example 21 includes subject matter where the script comprises one or both of a declarative expression of the plurality of tasks; and a programmatic expression of the plurality of tasks.

In Example 23, the subject matter of Example 22 includes subject matter where the declarative expression is associated with execution of the plurality of tasks as one or both of parallel executed workloads and serially executed workloads.

In Example 24, the subject matter of Examples 22-23 includes subject matter where the programmatic expression includes programmatic code describing a sequence for performing the plurality of tasks.

In Example 25, the subject matter of Example 24 includes, the operations further comprising: executing the programmatic code to perform at least one failure experiment associated with the plurality of tasks.

In Example 26, the subject matter of Examples 21-25 includes subject matter where the plurality of workflow steps comprise: a first subset of workflow steps associated with one or more workloads; and a second subset of workflow steps associated with one or more failure experiments.

In Example 27, the subject matter of Example 26 includes, the operations further comprising: configuring at least a first container of the one or more containers to execute the script for each of the one or more workloads on a testing node.

In Example 28, the subject matter of Example 27 includes, the operations further comprising: configuring at least a second container of the one or more containers to execute the script for each of the one or more failure experiments on the testing node, wherein execution of the script for each of the one or more failure experiments triggers an error condition on the testing node.

In Example 29, the subject matter of Example 28 includes, the operations further comprising: generating a notification based on at least one metric associated with execution of the one or more workloads and the one or more failure experiments.

In Example 30, the subject matter of Examples 21-29 includes, the operations further comprising: decoding the workflow to obtain a duration value and configuring a duration for execution of the script based on the duration value.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
decoding a workflow to obtain a plurality of workflow steps, each workflow step of the plurality of workflow steps comprising a runtime engine identifier and a script identifier;
retrieving a script for a workflow step of the plurality of workflow steps based on the script identifier, the script specifying a plurality of tasks;
configuring one or more containers with a runtime engine based on the runtime engine identifier; and
executing the script against the one or more containers using the runtime engine, to perform the plurality of tasks.

2. The system of claim 1, wherein the script comprises one or both of:
  a declarative expression of the plurality of tasks; and
  a programmatic expression of the plurality of tasks.

3. The system of claim 2, wherein the declarative expression is associated with execution of the plurality of tasks as one or both of parallel executed workloads and serially executed workloads.

4. The system of claim 2, wherein the programmatic expression includes programmatic code describing a sequence for performing the plurality of tasks.

5. The system of claim 4, wherein the at least one hardware processor further performs operations comprising:
  executing the programmatic code to perform at least one failure experiment associated with the plurality of tasks.

6. The system of claim 1, wherein the plurality of workflow steps comprise:
  a first subset of workflow steps associated with one or more workloads; and
  a second subset of workflow steps associated with one or more failure experiments.

7. The system of claim 6, wherein the at least one hardware processor further performs operations comprising:
  configuring at least a first container of the one or more containers to execute the script for each of the one or more workloads on a testing node.

8. The system of claim 7, wherein the at least one hardware processor further performs operations comprising:
  configuring at least a second container of the one or more containers to execute the script for each of the one or more failure experiments on the testing node, wherein execution of the script for each of the one or more failure experiments triggers an error condition on the testing node.

9. The system of claim 8, wherein the at least one hardware processor further performs operations comprising:
  generating a notification based on at least one metric associated with execution of the one or more workloads and the one or more failure experiments.

10. The system of claim 1, wherein the at least one hardware processor further performs operations comprising:
  decoding the workflow to obtain a duration value; and
  configuring a duration for execution of the script based on the duration value.

11. A method comprising:
  decoding, by at least one hardware processor, a workflow to obtain a plurality of workflow steps, each workflow step of the plurality of workflow steps comprising a runtime engine identifier and a script identifier;
  retrieving, by the at least one hardware processor, a script for a workflow step of the plurality of workflow steps based on the script identifier, the script specifying a plurality of tasks;
  configuring, by the at least one hardware processor, one or more containers with a runtime engine based on the runtime engine identifier; and
  executing, by the at least one hardware processor, the script against the one or more containers using the runtime engine, to perform the plurality of tasks.

12. The method of claim 11, wherein the script comprises one or both of:
  a declarative expression of the plurality of tasks; and
  a programmatic expression of the plurality of tasks.

13. The method of claim 12, wherein the declarative expression is associated with execution of the plurality of tasks as one or both of parallel executed workloads and serially executed workloads.

14. The method of claim 12, wherein the programmatic expression includes programmatic code describing a sequence for performing the plurality of tasks.

15. The method of claim 14, further comprising:
  executing the programmatic code to perform at least one failure experiment associated with the plurality of tasks.

16. The method of claim 11, wherein the plurality of workflow steps comprise:
  a first subset of workflow steps associated with one or more workloads; and
  a second subset of workflow steps associated with one or more failure experiments.

17. The method of claim 16, further comprising:
  configuring at least a first container of the one or more containers to execute the script for each of the one or more workloads on a testing node.

18. The method of claim 17, further comprising:
  configuring at least a second container of the one or more containers to execute the script for each of the one or more failure experiments on the testing node, wherein execution of the script for each of the one or more failure experiments triggers an error condition on the testing node.

19. The method of claim 18, further comprising:
  generating a notification based on at least one metric associated with execution of the one or more workloads and the one or more failure experiments.

20. The method of claim 11, further comprising:
  decoding the workflow to obtain a duration value; and
  configuring a duration for execution of the script based on the duration value.

21. A computer-storage medium comprising instructions that, when executed by one or more processors of a machine, configure the machine to perform operations comprising:
  decoding, by at least one hardware processor, a workflow to obtain a plurality of workflow steps, each workflow step of the plurality of workflow steps comprising a runtime engine identifier and a script identifier;
  retrieving, by the at least one hardware processor, a script for a workflow step of the plurality of workflow steps based on the script identifier, the script specifying a plurality of tasks;
  configuring, by the at least one hardware processor, one or more containers with a runtime engine based on the runtime engine identifier; and
  executing, by the at least one hardware processor, the script against the one or more containers using the runtime engine, to perform the plurality of tasks.

22. The computer-storage medium of claim 21, wherein the script comprises one or both of:
  a declarative expression of the plurality of tasks; and
  a programmatic expression of the plurality of tasks.

23. The computer-storage medium of claim 22, wherein the declarative expression is associated with execution of the plurality of tasks as one or both of parallel executed workloads and serially executed workloads.

24. The computer-storage medium of claim 22, wherein the programmatic expression includes programmatic code describing a sequence for performing the plurality of tasks.

25. The computer-storage medium of claim 24, the operations further comprising:
   executing the programmatic code to perform at least one failure experiment associated with the plurality of tasks.

26. The computer-storage medium of claim 21, wherein the plurality of workflow steps comprise:
   a first subset of workflow steps associated with one or more workloads; and
   a second subset of workflow steps associated with one or more failure experiments.

27. The computer-storage medium of claim 26, the operations further comprising:
   configuring at least a first container of the one or more containers to execute the script for each of the one or more workloads on a testing node.

28. The computer-storage medium of claim 27, the operations further comprising:
   configuring at least a second container of the one or more containers to execute the script for each of the one or more failure experiments on the testing node, wherein execution of the script for each of the one or more failure experiments triggers an error condition on the testing node.

29. The computer-storage medium of claim 28, the operations further comprising:
   generating a notification based on at least one metric associated with execution of the one or more workloads and the one or more failure experiments.

30. The computer-storage medium of claim 21, the operations further comprising:
   decoding the workflow to obtain a duration value; and
   configuring a duration for execution of the script based on the duration value.

* * * * *